United States Patent Office 2,744,094
Patented May 1, 1956

2,744,094

LINEAR POLYESTERS FROM p,p'-SULFONYL DIBENZOIC ACID PLUS AN AROMATIC ACID CONDENSED WITH A GLYCOL

John R. Caldwell, Kingsport, Tenn., assignor to Eastman Kodak Company, Rochester, N. Y., a corporation of New Jersey No Drawing. Application October 3, 1952,
Serial No. 313,066

24 Claims. (Cl. 260—75)

This application relates to valuable linear polyesters prepared by condensing a p,p'-sulfonyl dibenzoic acid diester in conjunction with an aromatic dibasic acid diester with a polymethylene glycol and/or an aliphatic ether glycol.

It is an object of this invention to provide novel interpolyesters as described herein. It is another object to provide a process as described herein for preparing valuable interpolyesters. Other objects will become apparent hereinafter.

This application is a continuation-in-part of my copending application, Serial No. 143,594, filed February 10, 1950, now U. S. Patent No. 2,614,120, dated October 14, 1952. In that application sulfonyl dibenzoic acid is called bis (dicarboxydiphenylsulfone).

Highly polymeric esters of terephthalic acid and various glycols, for example, ethylene glycol, trimethylene glycol, hexamethylene glycol, etc., are well known, and have been used in the preparation of linear, highly polymeric polyetsers having properties including that of being capable of being formed into useful filaments, fibers and the like, and having high melting points and a low degree of solubility in organic solvents. Linear polyesters prepared from other aromatic dicarboxylic acids have also been described in the prior art and contemporary art.

Interpolyesters of terephthalic acid and other dibasic acids condensed with dihydroxy compounds have also been described.

None of the polyesters known in the prior art are easily prepared without high cost. Moreover, they do not possess the herein-described highly advantageous properties which render them especially suitable for processing by injection molding and extrusion methods.

It has now been found that p,p'-sulfonyl dibenzoic acid or its esters or its acid chloride plus an aromatic dibasic acid diester of the type described below can be condensed with a polymethylene glycol and/or an aliphatic ether glycol to produce a new kind of linear interpolyester having highly valuable properties which are superior to those of the linear polyesters described in the prior art. Thus, my new interpolyesters can be prepared having a relatively wide softening range and good flow characteristics whereby they are quite valuable for the production of shaped objects by injection molding or extrusion methods. These novel interpolyesters can be prepared so as to soften at temperatures which are above about 180° C. Useful interpolyesters can also be prepared which soften at lower temperatures.

The novel interpolyesters described herein are quite useful in the making of photographic film base. They are also valuable in the manufacture of electrical insulation.

Some of these novel interpolyesters can be employed to form fibers by melt spinning methods.

My novel interpolyesters may contain as constituents thereof small percentages of the m,m' and/or the m,p' isomers of the p,p'-sulfonyl dibenzoic compound without significant deleterious effect on the properties of these interpolyesters. In fact, when the polyester is to be employed for purposes other than for making fibers, substantial quantities of these isomers can be employed with some advantageous results, especially as regards increasing the softening temperature range.

These novel interpolyesters are particularly advantageous for preparing a photographic film base and for related purposes because of the excellent dimensional stability and low water absorption quality. Thus, photographic film made from such an interpolyester retains its original dimensions to a very high degree despite the effects of changes in the humidity of the atmosphere, the treatment of the film with developing solutions, etc. The improvement is surprisingly great in comparison to conventional film made with cellulose derivatives such as the various alkanoic esters or the nitrate; moreover, no plasticizer is needed in conjunction with these novel interpolyesters. Furthermore, no solvent need be employed in preparing sheets or film from these novel interpolyesters inasmuch as extrusion methods can be employed whereby substantial savings in the costs of solution methods and solvent recovery can be avoided.

Two of the outstanding qualities of the interpolyesters of this invention are their excellent dimensional stability and low degree of water absorptivity. This results in superior resistance to dimensional change despite changes in atmospheric humidity or immersion in aqueous solutions.

The interpolyesters of this invention have melting points which are up to as much as or more than 50° C. higher than corresponding interpolyesters prepared from dibasic acidic compound combinations described in the prior art. This characteristic results in a much greater effective range of utility for these new interpolyesters, for instance, gaskets can be prepared for employment in equipment operating at higher temperatures, fibers can be made which withstand higher ironing temperatures when fabrics are prepared from yarns incorporating these fibers, etc.

One embodiment of this invention relates to a process for preparing an interpolyester comprising (A) condensing about 10 mole proportions of a sulfonyl dibenzoic compound having the formula:

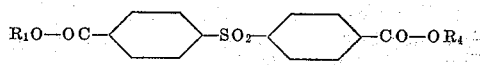

wherein $R_1$ and $R_4$ each represents a substituent selected from the group consisting of a β-hydroxyalkyl radical containing from 2 to 4 carbon atoms, an omega-hydroxyalkyl radical containing from 3 to 12 carbon atoms and an alkyl radical containing from 1 to 6 carbon atoms, plus from about 2 to about 24 mole proportions of an aromatic dibasic acid diester selected from those having the following general formula:

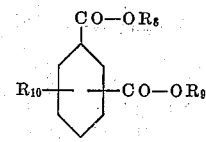

wherein the two carbalkoxy radicals are in positions with respect to each other selected from those consisting of the ortho, meta and para positions, $R_{10}$ represents at least one substituent selected from those consisting of a hydrogen atom, an alkyl radical containing from 1 to 6 carbon atoms, an aryl radical of the benzene series containing from 6 to 9 carbon atoms and a chlorine atom, which substituent ($R_{10}$) is in a position with respect to the —CO—$OR_8$ radical selected from the ortho, meta and para positions not already occupied by the —CO—$OR_9$ radical, and $R_8$ and $R_9$ each represents a substituent selected from the group consisting of an omega-hydroxyalkyl radical containing from 2 to 12 carbon atoms and an alkyl radical containing from 1 to 6 carbon atoms, (B) with a dioxy compound selected from the group consisting of those compounds having the following formulas:

$$R_5\text{—O—}(CH_2)_p\text{—O—}R_6$$

and $$R_5O\text{—}(\text{—}R_7\text{—O})_q\text{—}R_7\text{—}OR_6$$

wherein $p$ represents a positive integer of from 2 to 12, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and $q$ represents a positive integer of from 1 to 10 inclusive, the dioxy compound being employed in such a proportion that there is at least an equivalent amount of oxy substituents in proportion to the carbalkoxy substituents in the overall combinatoin of the diesters and the dioxy compounds, (C) in the presence of a condensing agent selected from the group consisting of the alkali metals, the alkaline earth metals, the oxides of these two groups of metals, the alkoxides containing from 1 to 6 carbon atoms of these two groups of metals, the carbonates and borates of these two groups of metals, lead oxide, and compounds having the following formulas:

$$M(Al(OR)_4),$$
$$M(HZr(OR)_6), M'(HZr(OR)_6)_2,$$
$$MH(Ti(OR)_6), M_2(Ti(OR)_6),$$
$$M'(HTi(OR)_6)_2, M'(Ti(OR)_6),$$
$$(RR'R''R''')_2(Ti(OR)_6),$$
$$(RR'R''R''')H(Ti(OR)_6),$$
$$Ti(OR)_4, PbR_4, \text{ and}$$
$$RMgHal$$

wherein M represents an alkali metal, M' represents an alkaline earth metal selected from the group consisting of magnesium, calcium and strontium, R represents an alkyl group containing from 1 to 6 carbon atoms, R', R'' and R''' each represents a member of the group consisting of R and an aryl group of the benzene series containing from 6 to 9 carbon atoms and Hal represents a halogen atom, (D) at an elevated temperature, (E) the condensation being conducted in an inert atmosphere, and (F) the latter part of the condensation being conducted at a very low pressure of the inert atmosphere.

Advantageously, the dioxy compound is employed in such a proportion that there are from about 1.2 to about 3 oxy substituents in proportion to the carbalkoxy substituents in the overall combination of the diesters and the dioxy compounds. Advantageously, the low pressure defined under (F) is less than about 15 mm. of Hg pressure. Advantageously, the elevated temperature employed during the earlier part of the condensation is from about 150° to about 220° C. Advantageously, the dioxy compound is a glycol having the formula:

$$HO\text{—}(CH_2)_p\text{—}OH$$

wherein $p$ is defined under (B) above.

Although the ratio of 10 moles of p,p'-sulfonyl dibenzoic ester to from 2 to 24 moles of aromatic diester can be employed as described above, the proportion of the aromatic diester is more advantageously from about 5 to 10 moles, i. e. from about 1 to 2 moles of the sulfonyl dibenzoic ester are most advantageously employed in conjunction with each mole of the aromatic diester.

The dioxy compounds defined above may not actually contain any free hydroxy radicals since they may be in esterified form as indicated by the formulas given. However, these hydroxy or substituted oxy radicals are referred to generically as oxy radicals or substituents. The dioxy compounds which can be employed in accordance with this invention are most advantageously dihydroxy compounds; such compounds will hereinafter be referred to as dihydroxy compounds although it is to be understood that dioxy compounds of the type described above are intended to be covered by this term. Each diester is considered as containing two carbalkoxy radicals as that term is employed in the definition of the process as described above since $R_1$ and $R_4$ may be alkyl radicals, omega hydroxyalkyl radicals or β-hydroxyalkyl radicals and $R_8$ and $R_9$ may be alkyl radicals or omega hydroxyalkyl radicals. Even when the process is preceded by the preliminary step described below employing free acids, the term carbalkoxy radicals in the description of the process is intended to encompass such free carboxy radicals.

Although sulfonyl dibenzoic acid is an aromatic acid, the term aromatic acid as used in this specification is restricted to those acids defined above which are employed in conjunction with the sulfonyl dibenzoic acid.

In addition to the process described above, this invention cover a process as defined above wherein either or both of the sulfonyl dibenzoic acid diester and the aromatic acid diester is/are formed by a preliminary step comprising condensing free p,p'-sulfonyl dibenzoic and/or free aromatic acid with a dihydroxy compound which is defined under (B) and is employed in the proportions set forth under (B), at an elevated temperature, after which preliminary step the condensing agent which is defined under (C) is added and the condensation is completed as defined under (D), (E) and (F). Advantageously the elevated temperature employed during the preliminary step is substantially that at which reflux conditions subsist; however, higher and lower temperatures can also be employed. Advantageously, as indicated above the dihydroxy compound is employed in such a proportion that there are from about 1.2 to about 3 hydroxy substituents in proportion to the carboxy and carbalkoxy substituents in the overall combination of the diacids, diesters, and dihydroxy compounds. In addition to employing this preliminary step to esterify the free acids referred to above, this same preliminary step can be applied to the anhydride of phthalic acid (ortho isomer) and the substituted derivatives thereof.

As indicated above, the interpolyesters described herein have relatively wide softening ranges and good flow properties. In this respect, they differ from most types of high-melting linear polyesters, such as polyethylene terephthalate, which possess sharp melting points. Thus, these modified polyesters of sulfonyl dibenzoic acid soften over a sufficiently wide temperature range that they can be advantageously employed in the production of shaped objects by injection molding and extrusion methods.

The alkylene glycols which can be employed to form highly polymeric linear polyesters are straight-chain alkane diols, viz. polymethylene glycols, wherein the hydroxy radicals are positioned at the two ends of the alkylene chain. Examples of such glycols include ethylene glycol, 1,3-propylene glycol, 1,4-butylene glycol, 1,6-hexylene glycol, 1,10-decamethylene glycol, 1,12-dodecamethylene glycol, etc. As indicated above, mono or diesters of these glycols can also be employed. Thus, the acetates, propionates and butyrates are examples of such esters. The defined ether glycols can be employed either in lieu of the polymethylene glycols or in conjunction therewith as modifiers. Mixtures of alkylene glycols or ether glycols can also be employed. Examples of ether glycols include diethylene glycol, triethylene glycol, tetraethylene glycol, bis(4-hydroxybutyl) ether, bis(3-hydroxypropyl) ether, etc. When mixtures of alkylene glycols and ether glycols are employed, it is generally preferable to employ a major proportion of the alkylene glycol in order to obtain higher melting linear polyesters. The high melting characteristic also is dependent upon the amount of aromatic acid present in the interpolyester and the chain length of the alkylene glycol employed. Higher proportions of the aromatic dibasic acid lower the melting and softening temperatures of the interpolyesters. The same effect is created by employing a longer chain (higher carbon content) alkylene glycol. For example, when a 10-12 carbon atom glycol is employed, the amount of aliphatic ether glycol used should preferably be not more than about 10-20 mole per cent of the combined glycols; whereas, when a 2-4 carbon atom glycol is employed the amount of ether glycol can be as high as about 50 to 100 mole per cent of the total quantity of dihydroxy compounds employed.

When no ether glycol is employed (i. e., only a polymethylene glycol is used), it is preferred to keep the mole ratio of sulfonyl dibenzoic diester to aromatic diester in the range of 10:6 to 10:23 (i. e. from about 40 to about 70 mole per cent of aromatic diester in the combined diesters). When a smaller proportion of aromatic diester is employed the interpolyester obtained may have an excessively high melting temperature (at or above its decomposition temperature); however, this may be avoided by employing a polymethylene glycol having a long chain (e. g. hexamethylene, octamethylene or dodecamethylene glycol). Thus, when a 6 to 12 carbon atom polymethylene glycol is employed, the mole ratio can be in the range of from about 10:2 to 10:6 (i. e. from about 15 to 40 mole per cent of the aromatic diester based on the combined diesters).

Valuable fibers can be advantageously prepared employing the higher melting interpolyesters described herein. Preferably no aliphatic ether glycol is employed when fibers are to be prepared. However, on the other hand, valuable interpolyesters can be prepared employing aliphatic ether glycols without any alkylene glycol although the product obtained will not be suitable for forming useful fibers.

The catalytic condensing agents which can be employed have been described above. From about 0.005% to about 0.2% of such catalysts based on the weight of the reactants being condensed can be employed. Higher or lower percentages can also be employed. Generally, from about 0.01% to about 0.06% of the catalytic condensing agent can be advantageously employed based on the weight of the various diesters being condensed.

The temperature at which polyesterification can be conducted is dependent upon the specific reactants involved in any given reaction. In general, the reaction mixture can be heated with agitation at from about 150° to about 220° C. for from approximately two to three hours in an inert atmosphere (e. g. nitrogen or hydrogen); the mixture can then be heated with agitation at from about 225°-240° to about 280°-310° C. in the same atmosphere for approximately 1 to 2 hours. Finally, the pressure can be greatly reduced to form a vacuum (less than about 15 mm. of Hg pressure) while the temperature is maintained in the same range (225°-310° C.); these conditions are advantageously maintained for approximately 4 to 6 additional hours. This final phase is advantageously carried out with good agitation under the high vacuum in order to facilitate the escape of volatile products from the highly viscous melt. The conditions can be varied considerably depending upon the degree of polyesterification desired, the ultimate properties sought, the stability of the polyester being produced, and the use for which the product is intended. Thus, the extent of the substitution of the sulfonyl dibenzoic diesters with the esters of additional modifying acid necessitates variations in these conditions of temperature, pressure and time periods required. The employment of the novel catalytic condensing agents listed hereinabove results in better products being prepared in much less time than is possible when the catalysts of the prior art are employed.

It has been found that the type of catalyst used has an important bearing upon the properties of the final product. Although most of the catalysts cited in the prior art may be used, it has been found that certain novel catalysts give superior results. The aluminum and titanium alkoxide complexes described in copending applications filed on even date herewith are especially valuable for the preparation of the polyesters described here. Moreover, novel tin catalysts have also been found to be especially effective. See Caldwell Serial Nos. 313,072 and 313,078, Caldwell and Reynolds Serial No. 313,077, Wellman and Caldwell Serial No. 313,074, Serial No. 313,075, and Serial No. 313,076 and Wellman Serial No. 313,073, for a description of especially advantageous catalytic condensing agents.

The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc., can be used as the reaction medium.

It is important to exclude oxygen and moisture at all stages of the condensation reaction. Inert atmospheres which can be advantageously employed include nitrogen, hydrogen, helium, etc. Substantially anhydrous reactants can also be advantageously employed although this is not essential, especially if any water is removed in the earlier stages of the condensation.

As indicated above, the acidic constituents of the interpolyesters are employed in the form of their diesters. The omega-hydroxyalkyl diesters can be prepared as described above by heating a polymethylene glycol (or an aliphatic ether glycol), with the free acid, preferably employing an excess of the glycol. The beta-hydroxyalkyl diesters can be prepared as described in my parent application employing an alkylene oxide. The acid chlorides can be employed in some cases although the conditions involved are generally substantially different. The anhydride of o-phthalic acid can also be employed in preparing diesters thereof.

Examples of the various diesters which can be employed in accordance with the process of this invention include the ethyl, propyl, n-butyl, sec-butyl, isopropyl, sec-amyl, n-hexyl, 10-hydroxydecyl, 5-hydroxyamyl, 12-hydroxydodecyl, 2-hydroxyethyl, etc. diesters of either p,p'-sulfonyl dibenzoic acid or any of the aromatic acids of the type defined above.

Examples of suitable aromatic dibasic acids whose various esters can be employed include phthalic acid (ortho isomer), isophthalic acid (meta isomer), terephthalic acid (para isomer), 5-chloroisophthalic acid, 4-phenylphthalic acid, 3'-isopropyl-2,3-dicarboxybiphenyl (cf. Lux, Monatsh. f. Chemie 29, 772, 774 who also describes the dimethyl ester), and various other analogous compounds such as 3,4-dicarboxybiphenyl which can be prepared by oxidizing 3-carboxy-4-methyl-biphenyl (also called 2-methyl-4-phenyl benzoic acid) in a hot alkaline solution (presence of NaOH) employing potassium permanganate as the oxidizing agent (see Zincke et al., Berichte Deutsch. Chem. Gesellsch., 55, 2184); other related dicarboxy-biphenyl derivatives can be similarly prepared by oxidizing the corresponding monomethyl carboxybiphenyl.

When the novel catalytic condensing agents described hereinabove and in copending applications referred to herein are employed, the simple alkyl esters of these various dibasic acids can be advantageously employed, whereas if the catalysts known to the prior art are employed, the condensation will not proceed as rapidly or as effectively although satisfactory results can be obtained.

As indicated hereinabove, some of the isomers of p,p'-sulfonyl dibenzoic acid can be employed under some circumstances with resultant lowering of the melting or softening temperatures but with a probable increase in the softening range of temperatures. The same effect is produced when homologs of p,p'-sulfonyl dibenzoic acid are incorporated into the materials being condensed to prepare these interpolyesters. If homologs are employed, they are most advantageously those of p,p'-sulfonyl dibenzoic acid, e. g. m,m'-dimethyl-p,p'-sulfonyl dibenzoic acid, o-ethyl-p,p'-sulfonyl dibenzoic acid, m-methyl-o-propyl-p,p'-sulfonyl dibenzoic acid, etc. Small proportions of various diesters of such isomers and homologs can be employed in substitution for a corresponding quantity of the diester of p,p'-sulfonyl dibenzoic acid when the interpolyester product is not intended to be used in the preparation of fibers.

The products of this invention are linear interpolyesters which possess favorable flow characteristics over a temperature differential or range of about 5° to 20° C. and which contain in the interpolyester configuration a ratio of about 10 of the following repeating units:

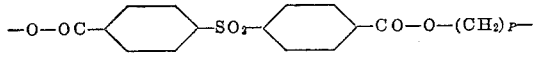

to each 2 to about 24 of one of the following repeating units:

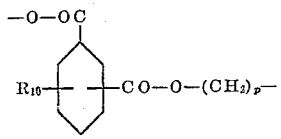

wherein $p$ and $R_{10}$ are defined hereinabove.

The above described interpolyesters can also have any one or more of the repeating units depicted above replaced entirely or in part, respectively, by one of the following repeating units:

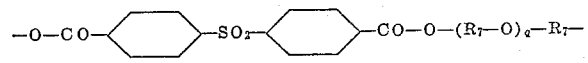

and

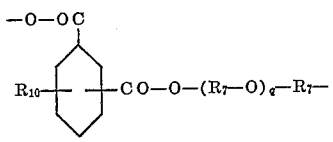

wherein $R_{10}$, $q$ and $R_7$ are defined hereinabove.

In the examples given below, the hot bar sticking temperature is referred to in several instances. The hot bar sticking test can be briefly described as follows: A polyester fiber is placed on the flat surface of a heated bar and a weight of 100 grams is applied to the fiber along a distance of ⅝ inch of the fiber length. The contact surface of this weight has a coating of polytetrafluoroethylene which acts as a thermal insulator. The fiber is allowed to remain in contact with the bar under this weight for one minute. The minimum temperature at which the fiber adheres to the hot bar under these conditions is the sticking temperature as that term is employed in the examples given herein.

This invention can be further illustrated by the following examples; in addition to these examples it is apparent that other variations and modifications thereof can be adapted to obtain similar results:

*Example 1.—Dimethyl isophthalate and ethylene glycol*

Four hundred and twenty g. (1.0 mol) p,p'-sulfonyldibenzoic acid dibutyl ester, 388 g. (2.0 mol) dimethyl isophthalate and 380 g. (6.0 mol) ethylene glycol were placed in a reaction vessel equipped with a stirrer, a short distillation column, and an inlet for purified hydrogen. Magnesium turnings (0.2 g.) were heated in iodine vapors to activate the surface and added as a catalyst. The reaction mixture was stirred at 190–195° C. in an atmosphere of hydrogen. A mixture of butyl alcohol and methyl alcohol distilled off and the reaction was 80–90% complete in three hours. The temperature was then raised to 270–275° and held for 30 minutes. A vacuum of 1.0 to 2.0 mm. was applied for 5 to 6 hours. The product obtained has an intrinsic viscosity of 0.5 to 0.6 in 60% phenol-40% tetrachlorethane solution. It softens at 220–230° C. It is suitable for the preparation of films, fibers, and molded objects.

*Example 2.—Dimethyl terephthalate and tetramethylene glycol*

Three hundred and seventy-two g. (1.0 mol) of p,p'-sulfonyldibenzoic acid diethyl ester, 300 g. (1.5 mol) dimethyl terephthalate, and 450 g. (5.0 mols) tetramethylene glycol were placed in a reaction vessel equipped with a stirrer, a short distillation column, and an inlet for purified nitrogen. A solution of 0.4 g. sodium titanium butoxide in 10 cc. butyl alcohol was added as a catalyst. The mixture was stirred at 190–200° C. in a stream of pure nitrogen. The distillation of methyl and butyl alcohols was 80–90% complete in two hours. The temperature was then raised to 265–270° and held for 40 minutes. A vacuum of 2 mm. of Hg pressure was then applied for 1.0 to 1.5 hours. The product obtained has an inherent viscosity of 0.7 in 40% tetrachlorethane-60% phenol. It is soluble in γ-butyrolactone, ethylene carbonate, and sulfolane at 120–140° C. and precipitates when the solutions are cooled. This polyester is especially valuable as a photographic film base. It softens over the range of 180–210° C. and can be extruded readily by ordinary equipment to give films, sheets, rods, tubes, etc.

*Example 3.—Dimethyl phthalate and tetramethylene glycol*

Four hundred and twenty g. (1.0 mol) of p,p'-sulfonyldibenzoic acid dibutyl ester, 194 g. (1.0 mol) dimethyl o-phthalate, and 300 g. tetramethylene glycol were placed in a reaction vessel as described in Example 1. A solution of 0.3 g. lithium aluminum ethoxide in 5 cc. ethyl alcohol was added as a catalyst. The mixture was heated at 200–210° C. until the distillation of butyl and methyl alcohols was practically complete. The temperature was then raised to 255–260° and held for 45 minutes. A vacuum of 1 to 2 mm. of Hg was applied and stirring was continued for 1.5 to 2 hours. The product obtained has an inherent viscosity of 0.7 to 0.8 in 60% phenol-40% tetrachlorethane. This polyester is especially valuable as a molding plastic because it has a relatively wide softening range and shows good flow properties during extrusion. It is also useful as a photographic film base. When oriented by drafting and then heat treated, fibers and films show a hot bar sticking temperature of 190–200° C.

*Example 4.—Dimethyl isophthalate and pentamethylene glycol*

Three hundred and seventy-two g. (1.0 mol) of p,p'-sulfonyldibenzoic acid diethyl ester, 50 g. (0.25 mol) dimethyl isophthalate, and 210 g. pentamethylene glycol were placed in a reaction vessel as described in Example 1. A solution of 0.3 g. sodium titanium butoxide in 10 cc. butyl alcohol was added as a catalyst. The mixture was stirred at 210–215° C. in a stream of purified nitrogen until about 80–85% of the methyl and ethyl alcohols had distilled off. The temperature was then raised to 250–260° and held for 30 minutes. A vacuum of 2 to 3 mm. of Hg pressure was applied for 2½ hours. The product obtained is especially useful for the manufacture of photographic film base. When properly oriented and heat treated, it sticks to the hot bar at about 200° C.

*Example 5.—Dimethyl isophthalate and pentamethylene glycol*

The procedure of Example 4 was repeated exactly except that the quantity of dimethyl isophthalate was increased to 0.33 gram moles. The interpolyester product obtained had essentially the same properties except that it sticks to the hot bar at about 160°–170° C.

*Example 6.—Dimethyl isophthalate and hexamethylene glycol*

The procedure of Example 4 was repeated exactly except that 250 grams of hexamethylene glycol were employed in lieu of the pentamethylene glycol. The interpolyester product obtained has essentially the same properties as the product of Example 4 except that the melting and softening temperatures were lower.

*Example 7.—Dimethyl phthalate and pentamethylene glycol*

Four hundred and twenty g. (1.0 mol) of p,p'-sulfonyldibenzoic acid dibutyl ester, 50 g. (0.25 mol) dimethyl-o-phthalate, and 250 g. pentamethylene glycol were reacted, using 0.25 g. sodium aluminum ethoxide as a catalyst. Except for the change of materials, the procedure was otherwise the same as that described above in Example 1. The product is especially valuable as a molding plastic, electrical insulator, and photographic film base. It shows excellent extrusion properties. When oriented and heat treated, films of the interpolyester product have a hot bar sticking temperature of 170–180° C.

*Example 8.—Dimethyl isophthalate and pentamethylene glycol*

One mol of methyl isophthalate, 5 mols of p,p'-sulfonyldibenzoic acid ethyl ester, and 10 mols 1,5-pentanediol were placed in a vessel as described in Example 1. Six-hundredths per cent potassium aluminum isobutoxide was added, based on the weight of the two esters. A heating schedule similar to that given in Example 1 was followed. The interpolyester product is hard and crystalline. It is useful for injection molding.

*Example 9.—Dimethyl isophthalate and pentamethylene glycol*

One mol of methyl isophthalate, 5 mols of p,p'-sulfonyldibenzoic acid ethyl ester, and 10 mols 1,5-pentanediol were placed in a vessel as described in Example 1. Six-hundredths per cent $Mg(HZr(OC_4H_9)_6)_2$ was added as a catalyst, based on the weight of the two esters. A heating schedule similar to that given in Example 1 was followed. The interpolyester product is hard and crystalline. It is useful for injection molding.

*Example 10.—Dimethyl isophthalate and pentamethylene glycol*

One mol of methyl isophthalate, 5 mols of p,p'-sulfonyldibenzoic acid ethyl ester, and 10 mols 1,5-pentanediol were placed in a vessel as described in Example 1. Six-hundredths per cent $Li_2(Ti(isoC_4H_9-O)_6)$ was added as a catalyst, based on the weight of the two esters. A heating schedule similar to that given in Example 1 was followed. The interpolyester product is hard and crystalline. It is useful for injection molding.

*Example 11.—Dimethyl isophthaalte and pentamethylene glycol*

One mol of methyl isophthalate, 5 mols of p,p'-sulfonyldibenzoic acid ethyl ester, and 10 mols 1,5-pentanediol were placed in a vessel as described in Example 1. Six-hundredths per cent $Sr(HTi(OC_4H_9)_6)_2$ was added as a catalyst, based on the weight of the two esters. A heating schedule similar to that given in Example 1 was followed. The interpolyester product is hard and crystalline. It is useful for injection molding.

*Example 12.—Dimethyl isophthalate and pentamethylene glycol*

One mol of methyl isophthalate, 5 mols of p,p'-sulfonyldibenzoic acid ethyl ester, and 10 mols 1,5-pentanediol were placed in a vessel as described in Example 1. Six-hundredths per cent

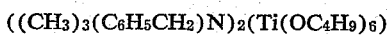

$((CH_3)_3(C_6H_5CH_2)N)_2(Ti(OC_4H_9)_6)$ was added as a catalyst, based on the weight of the two esters. A heating schedule similar to that given in Example 1 was followed. The interpolyester product is hard and crystalline. It is useful for injection molding.

*Example 13.—Dimethyl isophthalate and decamethylene glycol*

One mol of methyl isophthalate, 5 mols of p,p'-sulfonyldibenzoic acid ethyl ester, and 10 mols 1,10-decanediol were placed in a vessel as described in Example 1. Six-hundredths per cent $Ti(OC_4H_9)_4$ was added as a catalyst, based on the weight of the two esters. A heating schedule similar to that given in Example 1 was followed. The product obtained is hard and crystalline. It is useful for injection molding.

*Example 14.—Dimethyl isophthalate and octamethylene glycol*

One mol of methyl isophthalate, 5 mols of p,p'-sulfonyldibenzoic acid ethyl ester, and 10 mols 1,8-octanediol were placed in a vessel as described in Example 1. Six-hundredths per cent $Pb(C_4H_9)_4$ was added as a catalyst, based on the weight of the two esters. A heating schedule similar to that given in Example 1 was followed. The interpolyester product is hard and crystalline. It is useful for injection molding.

*Example 15.—Diethyl isophthalate, ethylene glycol and diethylene glycol*

One gram mol (372 grams) of p,p'-sulfonyldibenzoic acid diethyl ester, 1 gram mol (222 grams) of diethyl isophthalate, 3 gram mols (186 grams) of ethylene glycol and 3 gram mols (318 grams) of diethylene glycol were placed in a reaction vessel as described in Example 1. An ethyl alcohol solution (5 cc.) containing 0.5 gram of potassium ethoxide was added as a catalyst. The mixture was heated at 200°–210° C. until distillation of alcohol had ceased. The temperature was then raised to 255°–260° and held for 1 hour. A vacuum of 0.2–0.4 mm. of Hg pressure was then applied and the reaction mixture was heated with continued stirring for 10 hours. The interpolyester obtained is especially valuable as a molding plastic because of its relatively wide softening range and it shows good flow properties during extrusion. It is useful in preparing films, sheets, rods, tubes, and other shaped products. It has a softening point too low for general suitability in the preparation of fibers.

*Example 16.—Terephthalic ester and octamethylene glycol*

1.5 gram mols (166 grams) of terephthalic acid and 5.0 gram mols (146 grams) of 1,8-octanediol were heated at the boiling point of the mixture employing apparatus as described in Example 2 until sufficient water has been removed to indicate formation of the omega-hydroxyoctyl diester, whereupon a solution of 0.3 g. of lithium aluminum ethoxide dissolved in 10 cc. of ethyl alcohol was added as a catalyst and 1.0 gram mol (372 grams) of p,p'-sulfonyl dibenzoic acid diethyl ester was introduced into the reaction mixture. The mixture was then stirred at 215°–225° C. under a hydrogen atmosphere until the distillation of alcohol was complete. The temperature was raised to 265°–270° C. and held for 45 minutes. A vacuum of 0.8–1.0 mm. of Hg pressure was then applied and the heating and agitation continued for two additional hours. The interpolyester obtained was hard and crystalline. It is useful in injection molding. It has a relatively wide softening range and good flow properties.

*Example 17.—Dimethyl phthalate and tetramethylene glycol*

The procedure described in Example 3 was repeated exactly except that a solution of 0.5 g. of sodium methoxide in methanol was employed as the sole catalyst and the final heating period was extended to 7 hours. The interpolyester obtained has properties similar to the product of Example 3. Comparable results can also be obtained using as the catalyst: K, Ca, $Li_2CO_3$, $Na_2BO_3$, PbO (litharge) etc. Such catalysts can also be employed in the processes described in the other examples given above after making suitable allowances for the differences in the reaction rates inherent in the change of the catalyst.

What I claim is:

1. A process for preparing a linear polyester comprising (A) condensing about 10 mole proportions of a p,p'-sulfonyl dibenzoic diester having the formula:

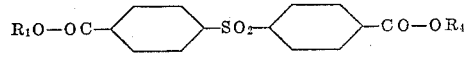

wherein $R_1$ and $R_4$ each represents a substituent selected from the group consisting of a β-hydroxyalkyl radical containing from 2 to 4 carbon atoms, an omega-hydroxyalkyl radical containing from 3 to 12 carbon atoms and an alkyl radical containing from 1 to 6 carbon atoms, plus from about 2 to about 24 mole proportions of an aromatic dibasic acid diester having the following general formula:

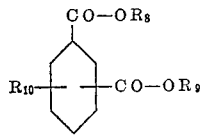

wherein the two carbalkoxy radicals are in positions with respect to each other selected from the group consisting of the ortho, meta and para positions, $R_{10}$ represents at least one substituent selected from the group consisting of a hydrogen atom, an alkyl radical containing from 1 to 6 carbon atoms, an aryl radical of the benzene series containing from 6 to 9 carbon atoms and a chlorine atom, which substituent ($R_{10}$) is in a position with respect to the —CO—OR$_8$ radical selected from the ortho, meta and para positions not already occupied by the —CO—OR$_9$ radical, and $R_8$ and $R_9$ each represents a substituent selected from the group consisting of an omega-hydroxyalkyl radical contaning from 2 to 12 carbon atoms and an alkyl radical containing from 1 to 6 carbon atoms, (B) with a dioxy compound selected from the group consisting of those compounds having the following formulas:

and
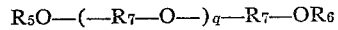

wherein $p$ represents a positive integer of from 2 to 12, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and $q$ represents a positive integer of from 1 to 10 inclusive, the dioxy compound being employed in such a proportion that there is at least an equivalent amount of oxy substituents in proportion to the carbalkoxy substituents in the overall combination of the diesters and the dioxy compound, (C) in the presence of a condensing agent selected from the group consisting of the alkali metals, the alkaline earth metals, the oxides of these two groups of metals, the alkoxides containing from 1 to 6 carbon atoms of these two groups of metals, the carbonates and borates of these two groups of metals and lead oxide, (D) at an elevated temperature, (E) the condensation being conducted in an inert atmosphere, and (F) the latter part of the condensation being conducted at a very low pressure of the inert atmosphere, said process encompassing the condensation of only those compounds referred to in (A) and (B) hereinabove.

2. A process as defined in claim 1 wherein the elevated temperature is increased gradually during the course of the condensation up to a temperature of from about 225° to about 310° C.

3. A process as defined in claim 2 wherein the condensing agent is employed in an amount of from about 0.005% to about 0.2% based on the weight of the diesters employed.

4. A process as defined in claim 3 wherein the dioxy compound is employed in such a proportion that there are from about 1.2 to about 3 oxy substituents in proportion to the carbalkoxy substituents in the overall combination of the diesters and the dioxy compound.

5. A process as defined in claim 4 wherein the elevated temperature employed during the earlier part of the condensation is from about 150° to about 220° C. and the low pressure defined under (F) is less than about 15 mm. of Hg pressure.

6. A process as defined in claim 5 wherein all materials employed in the process are substantially anhydrous.

7. A process as defined in claim 6 wherein the dioxy compound has the formula:

HO—(CH$_2$)$_p$—OH wherein $p$ is defined under (B).

8. A process as defined in claim 7 wherein the aromatic diester is dimethyl phthalate and the dihydroxy compound is tetramethylene glycol.

9. A process as defined in claim 7 wherein the aromatic diester is dimethyl isophthalate and the dihydroxy compound is ethylene glycol.

10. A process as defined in claim 7 wherein the aromatic diester is dimethyl isophthalate and the dihydroxy compound is pentamethylene glycol.

11. A process as defined in claim 7 wherein the aromatic diester is dimethyl isophthalate and the dihydroxy compound is hexamethylene glycol.

12. A process as defined in claim 7 wherein the aromatic diester is dimethyl terephthalate and the dihydroxy compound is tetramethylene glycol.

13. A process as defined in claim 1 wherein the sulfonyl dibenzoic diester is formed by a preliminary step comprising condensing p,p'-sulfonyl dibenzoic acid with a dioxy compound which is defined under (B), at an elevated temperature, after which preliminary step the condensing agent which is defined under (C) is added and the condensation is completed as defined under (D), (E) and (F).

14. A process as defined in claim 13 wherein the preliminary elevated temperature is substantially that at which reflux conditions subsist, the subsequent condensation being conducted at a temperature which is gradually increased during the course of the condensation up to about 280°–310° C., and the dioxy compound is employed in such a proportion that there are from about 1.2 to about 3 oxy substituents in proportion to the carboxy and carbalkoxy substituents in the overall combination of the diacids, diesters and dioxy compounds.

15. A process as defined in claim 1 wherein the aromatic dibasic acid diester is formed by a preliminary step comprising condensing an aromatic acid selected from the group having the following general formula:

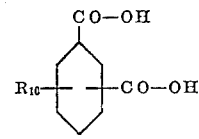

wherein the two carboxy radicals are in positions with respect to each other selected from those consisting of the ortho, meta and para positions, $R_{10}$ represents at least one substituent selected from the group consisting of a hydrogen atom, an alkyl radical containing from 1 to 6 carbon atoms, an aryl radical of the benzene series containing from 6 to 9 carbon atoms and a chlorine atom, which substituent ($R_{10}$) is in a position with respect to the fixed CO—OH radical selected from the ortho, meta and para positions not already occupied by either of the —CO—OH radicals, with a dioxy compound which is defined under (B), at an elevated temperature, after which preliminary step the condensing agent which is defined under (C) is added and the condensation is completed as defined under (D), (E) and (F).

16. A process as defined in claim 15 wherein the preliminary elevated temperature is substantially that at which reflux conditions subsist, the subsequent condensation being conducted at a temperature which is gradually increased during the course of the condensation up to about 280°–310° C., and the dioxy compound is employed in such a proportion that there are from about 1.2 to about 3 oxy substituents in proportion to the carboxy and carbalkoxy substituents in the overall combination of the diacids, diesters and dioxy compounds.

17. A process as defined in claim 16 wherein the condensing agent is employed in an amount of from about 0.005% to about 0.2% based on the weight of the diesters being condensed, the elevated temperature employed during the earlier part of the condensation to form the interpolyester is from about 150° C. to about 220 C. and the low pressure defined under (F) is less than about 15 mm. of Hg pressure.

18. A linear interpolyester having a softening temperature differential of from about 5° to 20° C. consisting of a ratio of about 10 of one of the following repeating units:

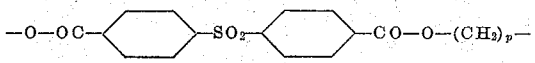

to each 1 to about 50 of one of the following repeating units:

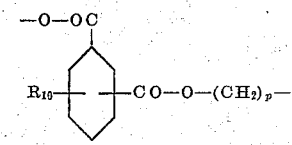

wherein $p$ represents a positive integer of from 2 to 12 and $R_{10}$ represents at least one substituent selected from those consisting of a hydrogen atom, an alkyl radical containing from 1 to 6 carbon atoms, an aryl radical of the benzene series containing from 6 to 9 carbon atoms and a chlorine atom, which substituent ($R_{10}$) is in a position with respect to the fixed —CO—O— radical selected from the ortho, meta and para positions not already occupied by either of the —CO—O— radicals and which interpolyester is capable of being readily formed into shaped objects within its softening range, and wherein the —(CH$_2$)$_p$— units in the molecular structure include a substantial proportion of such units wherein $p$ is at least 4.

19. A linear interpolyester as defined in claim 18 wherein at least one of the repeating units depicted therein is replaced by a member selected from the group consisting of the following repeating units corresponding thereto:

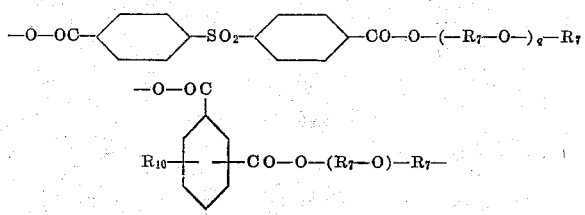

wherein $R_{10}$ represents at least one substituent selected from those consisting of a hydrogen atom, an alkyl radical containing from 1 to 6 carbon atoms, an aryl radical of the benzene series containing from 6 to 9 carbon atoms and a chlorine atom, which substituent ($R_{10}$) is in a position with respect to the fixed —CO—O— radical selected from the ortho, meta and para positions not already occupied by either of the —CO—O— radicals, $R_7$ represents an alkylene radical containing from 2 to 4 carbon atoms and $q$ represents a positive integer of from 1 to 10.

20. A linear interpolyester as defined in claim 18 wherein $p$ is 4, $R_{10}$ is a hydrogen atom and the two —CO—O— radicals are in ortho relationship on the benzene ring.

21. A linear interpolyester as defined in claim 18 wherein $p$ is 2, $R_{10}$ is a hydrogen atom and the two —CO—O— radicals are in meta relationship on the benzene ring.

22. A linear interpolyester as defined in claim 18 wherein $p$ is 5, $R_{10}$ is a hydrogen atom and the two —CO—O— radicals are in meta relationship on the benzene ring.

23. A linear interpolyester as defined in claim 18 wherein $p$ is 6, $R_{10}$ is a hydrogen atom and the two —CO—O— radicals are in meta relationship on the benzene ring.

24. A linear interpolyester as defined in claim 18 wherein $p$ is 4, $R_{10}$ is a hydrogen atom and the two —CO—O— radicals are in para relationship on the benzene ring.

References Cited in the file of this patent

UNITED STATES PATENTS

| | | |
|---|---|---|
| 2,437,046 | Rothrock et al. | Mar. 2, 1948 |
| 2,465,319 | Whinfield et al. | Mar. 22, 1949 |
| 2,547,113 | Drewitt et al. | Apr. 3, 1951 |
| 2,657,194 | Butler et al. | Oct. 27, 1953 |

FOREIGN PATENTS

| | | |
|---|---|---|
| 621,997 | Great Britain | Apr. 25, 1949 |